May 29, 1928.  W. C. READEKER  1,671,449

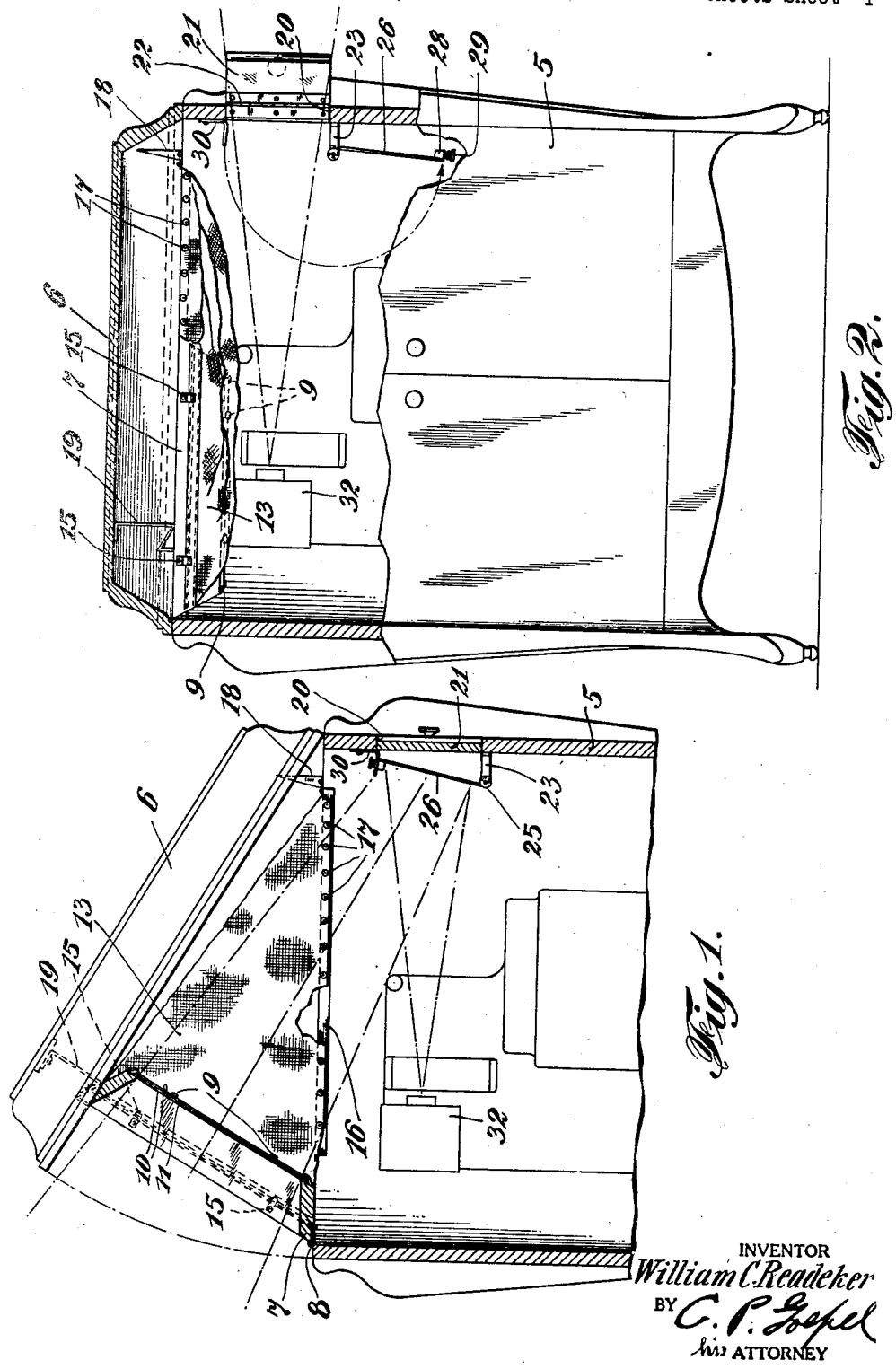

PROJECTION CABINET FOR MOTION PICTURE MACHINES

Filed Jan. 8, 1926  2 Sheets-Sheet 2

INVENTOR
William C. Readeker
BY C. P. Goepel
his ATTORNEY

Patented May 29, 1928.

1,671,449

UNITED STATES PATENT OFFICE.

WILLIAM C. READEKER, OF NEW YORK, N. Y.

PROJECTION CABINET FOR MOTION-PICTURE MACHINES.

Application filed January 8, 1926. Serial No. 79,917.

This invention relates to projection cabinets for motion picture machines, and has for its primary object to provide a portable cabinet for such machines which may be easily moved from place to place and provided with means whereby the pictures or images may be projected either upon a rear projection screen carried by the cabinet, or upon an independent front projection screen suitably arranged exteriorly of the cabinet.

More particularly, in a preferred embodiment of the invention, I provide a cabinet for the picture projection mechanism which in general is quite similar to such cabinets as are commonly employed in connection with sound reproducing machines. This cabinet is provided with a hinged top or cover and a rear projection screen hingedly connected at one end with the upper edge of the front body wall of the cabinet and normally sustained by suitable horizontal supporting rails on the side walls thereof when the cover is closed. The under side of the cover is provided with suitable means for sustaining said screen in obliquely inclined position between the open cover and the front wall of the cabinet. The rear wall of the cabinet is provided with an opening through which the images or pictures may be directly projected upon an externally arranged screen, said opening having a door or closure. Upon the inner side of said cabinet wall at the lower edge of the door, a reflector is hingedly mounted and when the pictures are projected through said opening, the reflector is disposed in an inoperative position out of the path of the light rays. When, however, it is desired to project the pictures upon said rear projection screen, said reflector is fixed in an obliquely inclined position over said opening for the projection of the pictures thereon, such pictures or images being thereby reflected upon the rear projection screen.

It is a further general object of my invention to provide a projection cabinet for motion picture machines which is simple and inexpensive in its construction, and may, therefore, be produced at nominal cost and is very serviceable and convenient in practical use.

With the above and other objects in view, the invention consists in the improved projection cabinet and in the form, construction and relative arrangement of its several parts as will be hereinafter more fully described, illustrated in the accompanying drawings, and subsequently incorporated in the subjoined claims.

In the drawings, wherein I have illustrated one simple and practical embodiment of the invention, and in which similar reference characters designate corresponding parts throughout the several views,—

Figure 1 is a vertical sectional view through the upper portion of the cabinet showing the cover in open position and illustrating the manner in which the pictures or images are projected upon the rear projection screen;

Fig. 2 is a front elevation of the cabinet with the upper portion thereof in section, the cover being closed and the pictures projected through the opening in the rear wall of the cabinet;

Figures 3, 4:
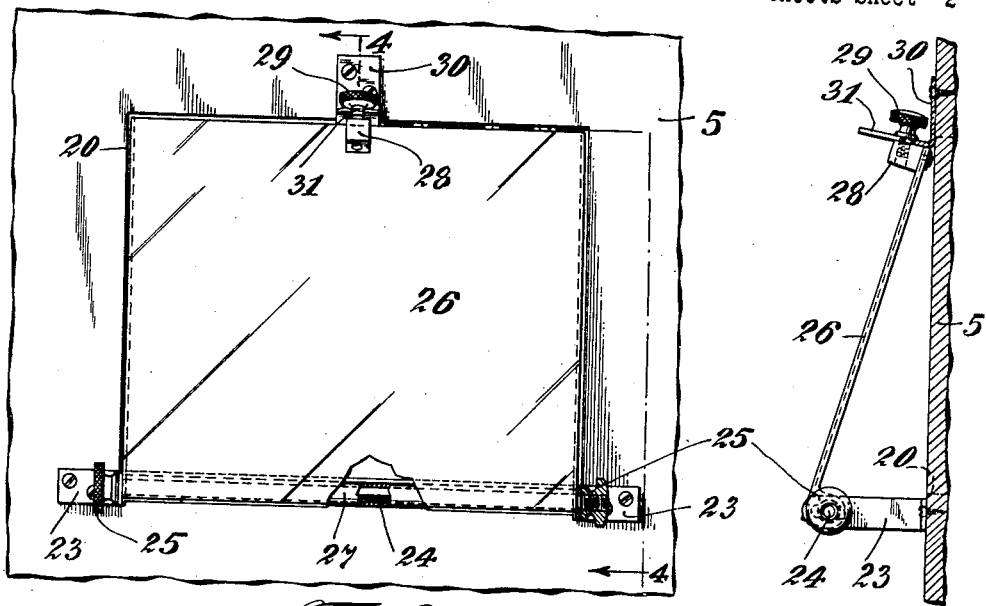
Fig. 3 is an enlarged interior elevation showing the hinged reflector in operative position.
Fig. 4 is a sectional view taken on the line 4—4 of Fig. 3;

Referring in detail to the drawings, I have therein illustrated a familiar form of cabinet 5 which, however, may be of any other desired ornamental configuration, said cabinet being provided with the usual front doors for affording access to the interior thereof and also having a top or cover 6 which is hingedly connected to the upper edge of the rear wall of the cabinet.

A frame 7 of general rectangular form is hingedly mounted at one of its edges as at 8 upon the upper edge of the front wall of the cabinet 5, and this frame carries the rear projection screen. This screen may be conveniently mounted between the angular metal strips 9 which are fixed to the rear edges of the frame 7.

Figure 5:
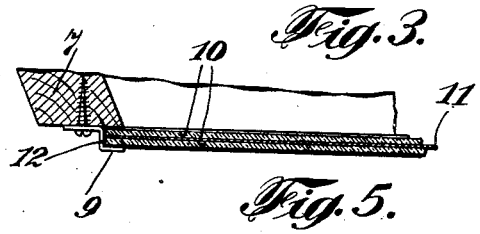
Fig. 5 is a fragmentary horizontal section of the rear projection screen.

I have devised a rear projection screen which has produced excellent results in practice, and as herein shown, this screen consists of two transparent plates 10, preferably glass between which there is interposed a relatively thin sheet of translucent material 11. I have secured the best results by using for this intermediate translucent sheet 11, ordinary commercial tracing cloth. The plates 10 and the sheet 11 are securely bound together at their marginal edges by a suitable binding tape indicated at 12, and these marginal edges of the screen are adapted to be mounted between the angular strips 9 on the hinged frame as illustrated in Fig. 5 of the drawings.

Figures 6, 7:
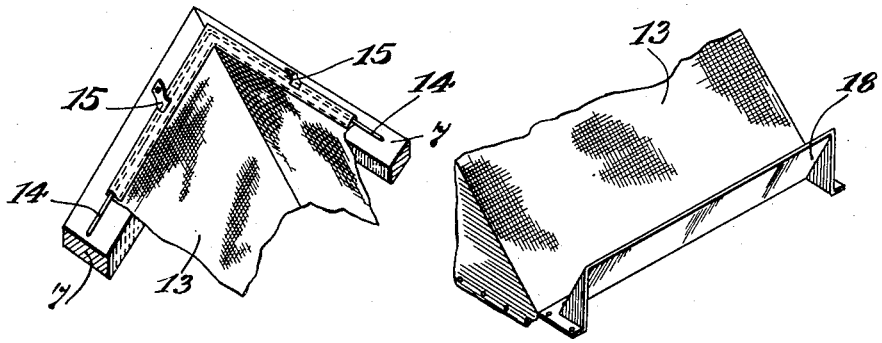
Fig. 6 is a detail fragmentary perspective view showing the manner of attaching the flexible hood to the hinged screen frame, Fig. 7 is a similar perspective view showing the rear end portion of the hood and the air vent for the interior of the cabinet.

To the free end and the sides of the hinged frame 7 one end of a flexible hood 13 is attached. Preferably, as shown in Fig. 6 of the drawings, the walls of the hood at this end thereof, are secured upon a relatively rigid wire rod 14, and the frame 7 carries a plurality of clips 15 for engagement therewith. The hood 13 extends rearwardly and downwardly from the frame and at its side edges is attached to the horizontal supporting rails 16 fixed to opposite walls of the cabinet 5 by means of suitable fasteners 17. These supporting rails are adapted to receive and sustain the screen frame 7 in a horizontal position when the cabinet cover 6 is closed as shown in Fig. 2 of the drawings.

At the rear end of the hood 13 and spaced from the rear wall of the cabinet an upwardly projecting transversely disposed vent 18 is arranged and suitably secured at its opposite ends to the cabinet walls. As shown in Fig. 7, this transverse metal vent is obliquely inclined in a rearward direction, and directs the heated air from the interior of the casing upwardly beneath the rear end of the cover, from whence it escapes at the opposite sides of the cabinet.

To the under side of the cover adjacent its forward free end, there is attached a suitable spring clip indicated at 19 which is adapted to engage the free end of the screen frame 7 to retain said frame and the rear projection screen in an obliquely inclined position between the cover and the front wall of the cabinet in the manner illustrated in Fig. 1 of the drawings.

The rear wall of the cabinet 5 is provided with an opening 20 therein and an outwardly swinging door 21 hingedly mounted as at 22 along one of the side edges of said opening. At the lower edge of the opening 20 and at opposite sides thereof supporting brackets 23 are fixed to the inner face of the cabinet wall and receive the opposite threaded ends of a rod 24. Nuts 25 threaded upon the ends of said rod retain the same in said brackets. A reflector 26 is provided at one edge with a sleeve or tube 27 loosely engaged for turning movement upon the rod 24 between the brackets 23 and at its opposite free edge this reflector is centrally provided with a lug 28 in which a screw 29 is adjustably threaded. This screw is adapted to be received in an open slot 31 provided in the inwardly projecting arm of a plate 30 fixed to the inner face of the cabinet wall at the upper edge of the opening 20.

Within the cabinet 5 the picture projecting mechanism generally indicated at 32 which may be of any suitable type, is mounted and arranged.

In the use of my improved projection cabinet, when a separate front projection screen can be conveniently erected in the room and it is desired to display the pictures or images to the view of a large audience, the door 21 is opened and the reflector 26 is allowed to hang in a pendant position from the brackets 23 as shown in Fig. 2 of the drawings. The cabinet being suitably positioned in front of the screen, it will be apparent that when the projecting mechanism 32 is operated, the pictures or images will be projected through the opening 20 of the cabinet wall and upon the surface of the screen. When, however, the pictures are to be exhibited only to a few persons and it is not convenient to erect a separate screen, the door 21 is closed, and the reflector 26 swung upwardly to the position shown in Figs. 1 and 4 of the drawings, the screw 29 being engaged in the slot 31 and then tightened upon the plate 30. It will be noted that when the reflector is thus positioned over the door opening 20, it is obliquely inclined with respect to the wall of the cabinet. Therefore, as seen in Fig. 1 of the drawings, the pictures or images will be first projected upon the surface of the reflector 26 and thereby reflected upwardly upon the rear projection screen carried by the frame 7 which has, of course, been raised to the obliquely inclined position between the open cover and the front wall of the cabinet as shown in Fig. 1 of the drawings. Owing to the construction of this screen, having the semi-opaque or translucent sheet 11 interposed between the transparent glass plates, the pictures or images are very clearly and vividly displayed to the view of persons standing in front of the screen. In this manner, it will be seen that by reason of my improvements, the pictures or images can be projected from the cabinet either upon a wholly independent screen erected in front thereof, or may be projected from the interior of the cabinet through the medium of the reflector 26, in a rearward direction upon the adjustable screen carried by the cabinet and constituting a part thereof. The hood 13 prevents external light rays from striking upon the rear projection screen when the cover is in its raised position, thus insuring a clear cut or well defined display of the pictures or images upon said screen.

From the foregoing description considered in connection with the accompanying drawings, the construction, manner of operation and several advantages of my improved motion picture projection cabinet will be readily understood. It will be seen that I have provided such a cabinet for individual or home use of picture projection machines which enables the owner to obtain the advantage of such entertainment whenever desired, and without necessitating the comparatively great expense involved in the erection of a suitable screen upon which the pictures are to be projected. At the same time, where such large independent screens are available, as in concert halls or auditoriums, my improved portable projection cabinet may also be used to advantage. In view of the relatively simple construction of my present improvements, it will also be apparent that the manufacturing cost of such a cabinet is not much greater than that involved in the production of such cabinets as heretofore employed for instance, in connection with sound producing apparatus. I have herein referred to an embodiment of my invention which has given excellent results in actual use. Nevertheless, it will be manifest that the several essential features thereof are susceptible of more or less modification in the form, construction and relative arrangement of the several parts and I, therefore, reserve the privilege of resorting to all such legitimate changes as may be fairly embodied within the spirit and scope of the invention as claimed.

I claim:

1. A projection cabinet for motion picture apparatus including a body to contain the projecting mechanism, a cover hinged upon the rear wall of said body at its upper end, a rear projection screen hingedly mounted upon the front wall of said body at its upper end and supported by the side walls of the cabinet body when the cover is closed, and means carried by said cover for sustaining the screen in a raised operative position above the side walls of the cabinet body when the cover is open.

2. A projection cabinet for motion picture apparatus including a body to contain the picture projecting mechanism, a hinged cover for said cabinet, a rear projection screen hingedly mounted along one of its edges upon the upper edge of one of the body walls of the cabinet, a flexible hood attached to said screen and to opposite side walls of the cabinet body, means carried by the cover for sustaining said screen in an operative position when the cover is open, and a reflector mounted upon another of the cabinet walls for reflecting images projected by said mechanism upon said rear projection screen.

3. A projection cabinet for motion picture apparatus including a body to contain the picture projecting mechanism, a hinged cover for said cabinet, a rear projection screen hingedly connected to the upper edge of one of the body walls of the cabinet, means on said cover for sustaining said screen in an operative position when the cover is open, projecting mechanism in the cabinet, another of the cabinet walls having an opening located in the path of projection of the pictures and through which the pictures are adapted to be directly projected upon an external screen, and an adjustable reflector mounted upon the inner side of said cabinet wall and adapted to be positioned over said opening to reflect the images upon said rear projection screen.

4. A projection cabinet for motion picture apparatus including a body to contain the picture projecting mechanism, a hinged cover for said cabinet, a rear projection screen hingedly connected to the upper edge of one of the body walls of the cabinet, means on said cover for sustaining said screen in an obliquely inclined position when the cover is open, projecting mechanism in the cabinet, another of the cabinet walls having an opening located in the path of projection of the pictures and through which the pictures are adapted to be directly projected upon an external screen, a reflector hingedly mounted upon the inner side of said cabinet wall at one edge of the opening therein and adapted to be moved to a position over said opening, and means for fixing said reflector in the latter position in obliquely inclined relation to the cabinet wall whereby the images are reflected from the interior of the cabinet upon said rear projection screen.

5. A projection cabinet for motion picture apparatus including a body to contain the picture projecting mechanism, a hinged cover for the cabinet, a frame hingedly mounted along one of its edges upon the upper edge of the cabinet body, a rear projection screen carried by said frame, means for sustaining said screen in an obliquely inclined position when the cover is open, a flexible hood connected to said frame and to opposite side walls of the cabinet, means on said cabinet walls to support said frame in a substantially horizontal position when the cover is closed, and a reflector mounted upon the rear wall of the cabinet and upon which the images are directly projected and reflected thereby upon said rear projection screen.

In testimony that I claim the foregoing as my invention, I have signed my name hereto.

W. C. READEKER.